United States Patent
Märte et al.

(10) Patent No.: US 12,521,909 B2
(45) Date of Patent: Jan. 13, 2026

(54) POWER TOOL FOR FORMING A CHANNEL IN A WORK SURFACE AND ACCESSORIES THEREFOR

(71) Applicant: Black & Decker, Inc., New Britain, CT (US)

(72) Inventors: Robin Märte, Idstein (DE); Arthur Lauer, Idstein (DE); Robert Miebach, Idstein (DE)

(73) Assignee: BLACK & DECKER, INC., New Britain, CT (US)

( * ) Notice: Subject to any disclaimer, the term of this patent is extended or adjusted under 35 U.S.C. 154(b) by 1039 days.

(21) Appl. No.: 16/725,390

(22) Filed: Dec. 23, 2019

(65) Prior Publication Data
US 2020/0368938 A1 Nov. 26, 2020

(30) Foreign Application Priority Data

| | | |
|---|---|---|
| May 24, 2019 | (EP) | 19176466 |
| Jun. 14, 2019 | (GB) | 1908566 |
| Dec. 18, 2019 | (EP) | 19217566 |

(51) Int. Cl.
  *B28D 1/04* (2006.01)
  *B23D 47/12* (2006.01)
  (Continued)

(52) U.S. Cl.
  CPC ............. *B28D 1/045* (2013.01); *B23D 47/12* (2013.01); *B27B 5/36* (2013.01); *B28D 1/041* (2013.01);
  (Continued)

(58) Field of Classification Search
  CPC ........ B28D 1/045; B28D 1/041; B28D 1/122; B28D 1/121; B28D 1/183; B27B 5/34;
  (Continued)

(56) References Cited

U.S. PATENT DOCUMENTS

| | | | |
|---|---|---|---|
| 447,716 A | | 3/1891 | Fox |
| 1,549,036 A | * | 8/1925 | Westgard ............... B27G 13/14 144/230 |

(Continued)

FOREIGN PATENT DOCUMENTS

| | | |
|---|---|---|
| DE | 10113301 B | 5/2008 |
| DE | 202014101388 U | 5/2014 |

(Continued)

OTHER PUBLICATIONS

Extended EP Search Report dated Aug. 4, 2020 for corresponding EP Application No. 19217566.9.

*Primary Examiner* — Makena S Markman
(74) *Attorney, Agent, or Firm* — Rhonda L. Barton

(57) ABSTRACT

A power tool for forming a channel in a work surface includes a first section carrying a rotatable shaft having a shaft axis and a second section that engages the work surface; a cutting disc having a substantially circular blade provided on the rotatable shaft; a first support portion on one side of the cutting disc and a second support portion on the opposite side of the cutting disc which cooperate to hold the cutting disc at an oblique angle relative to the shaft axis. A first locking feature of the first support portion and a second locking feature of the second support portion extend through a circular opening of the cutting disc and cooperate to resist relative rotation of the first and second support portions. The first section is movable relative to the second section to move the cutting disc into and out of engagement with the work surface.

9 Claims, 11 Drawing Sheets

(51) Int. Cl.
    *B23D 61/10*    (2006.01)
    *B24B 45/00*    (2006.01)
    *B27B 5/36*    (2006.01)
    *B28D 1/12*    (2006.01)
    *B28D 1/18*    (2006.01)
    *B24B 27/06*    (2006.01)
    *B24B 27/08*    (2006.01)

(52) U.S. Cl.
    CPC ............. *B28D 1/121* (2013.01); *B28D 1/122* (2013.01); *B28D 1/183* (2013.01); *B23D 61/10* (2013.01); *B24B 27/065* (2013.01); *B24B 27/085* (2013.01); *B24B 45/006* (2013.01)

(58) Field of Classification Search
    CPC .......... B27B 5/36; B23D 47/12; B23D 61/10; B27G 13/14; B24B 27/065; B24B 27/085; B24B 27/0608; B24B 45/006
    See application file for complete search history.

(56) References Cited

U.S. PATENT DOCUMENTS

| | | | | |
|---|---|---|---|---|
| 1,568,199 | A * | 1/1926 | Watson | B27B 5/36 144/238 |
| 1,923,159 | A | 8/1933 | Mclaren | |
| 2,922,449 | A * | 1/1960 | Sam | B27G 13/14 144/238 |
| 2,925,108 | A * | 2/1960 | Freeman | B27G 13/14 144/238 |
| 3,172,437 | A * | 3/1965 | Hansen | B27B 5/36 144/238 |
| 3,780,780 | A * | 12/1973 | Pettigrew | B27B 5/36 83/698.41 |
| 3,848,512 | A * | 11/1974 | Erhardt | B27B 5/36 409/234 |
| 4,018,256 | A * | 4/1977 | Niehaus | B27B 5/36 407/56 |
| 4,055,204 | A * | 10/1977 | Gunzner | B27B 5/36 407/31 |
| 4,305,441 | A * | 12/1981 | Ohmi | B27B 5/36 144/238 |
| 4,589,458 | A * | 5/1986 | McCord, Jr. | B27B 5/34 144/218 |
| 5,238,037 | A * | 8/1993 | Gunzner | B27B 5/36 144/218 |
| 8,974,155 | B2 | 3/2015 | Dressler | |
| 9,604,290 | B2 | 3/2017 | Kisselbach et al. | |
| 9,695,573 | B2 | 7/2017 | Sewell et al. | |
| 2009/0095141 | A1 * | 4/2009 | Billings | B27B 27/10 83/468.3 |
| 2017/0252835 | A1 | 9/2017 | Saffels et al. | |
| 2018/0001403 | A1 | 1/2018 | Kitayama et al. | |

FOREIGN PATENT DOCUMENTS

| | | |
|---|---|---|
| DE | 202014101738 U | 5/2014 |
| EP | 0314954 A2 | 5/1989 |
| EP | 1867420 B1 | 10/2013 |
| EP | 2799173 A | 11/2014 |
| KR | 20020017615 A | 3/2002 |
| WO | 2003070409 A1 | 8/2003 |

\* cited by examiner

POWER TOOL FOR FORMING A CHANNEL IN A WORK SURFACE AND ACCESSORIES THEREFOR

CROSS-REFERENCE TO RELATED APPLICATIONS

This application claims priority from EP Patent Application No. 19217566.9 filed 18 Dec. 2019, UK Patent Application No. 1908566.1 filed 14 Jun. 2019 and EP Patent Application No. 19176466.1 filed 24 May 2019 the disclosures of which is incorporated herein by reference in its entirety.

BACKGROUND OF THE INVENTION

Field of the Invention

This specification concerns a power tool for forming a channel in a work surface, for example a concrete surface, and a way of mounting at least one cutting disc to the power tool for enabling the channel to be formed in a single operational step.

Description of the Related Art

European patent EP2552660B1 describes a wall chaser which is a power tool for forming channels in a concrete surface. Objects such as cables and wires can be fed through such channels during a construction project. It is established trade practice for wall chaser tools to carry a pair of axially offset cutting discs which in use form two parallel slots in a concrete surface. Subsequently a construction worker is required to chisel away the concrete remaining between such slots, thereby leaving a channel of the kind heretofore mentioned for receiving cables and wires for example. A more efficient way of working is desired which is both safe and cost effective and aspects of the present invention are conceived with the foregoing in mind.

SUMMARY OF THE INVENTION

According to an aspect of the present invention there is provided a power tool for forming a channel in a concrete work surface comprising: a first section carrying a rotatable shaft extending along a shaft axis; a cutting disc having a substantially circular blade provided on the rotatable shaft by receiving the rotatable shaft through a circular opening of the cutting disc; a first support portion on one side of the cutting disc and a second support portion on the opposite side of the cutting disc which cooperate to hold the cutting disc at an oblique angle relative to the shaft axis, a first locking feature of the first support portion and a second locking feature of the second support portion extend through the circular opening of the cutting disc whereby such locking features cooperate to resist relative rotation of the first and second support portions; a second section for engaging the work surface, the first section being movable relative to the second section such that the cutting disc can be moved into and out of engagement with the work surface in use, wherein an active portion of the periphery of the cutting disc, being the part of the periphery furthest from the rotatable shaft in the direction of the work surface, oscillates along an axis parallel to the shaft axis when the rotatable shaft rotates.

The first locking feature of the first support portion may interlock with the second locking feature of the second support portion to resist relative rotation of the first and second support portions.

The locking feature of the first support portion may comprise a first set of projections and the locking feature of the second support portion may comprise a second set of projections.

The first and second support portions each have a rear surface distal from the cutting disc and at least two of the projections of each respective support portion may extend different distances from the rear surface.

At least two of the projections of each respective support portion may extend different distances along a direction parallel to the rotatable shaft.

Each of the first and second sets of projections may be circumferentially arranged.

The first and second support portions may each be configured so that more mass lies on one side of the rotatable shaft than the other.

The first and second support portions may each define a fin, wherein in use the fin of the first support portion is located on an opposite side of the rotatable shaft to the fin of the second support portion.

The fins may have variable thickness along their respective lengths.

According to an aspect of the present invention there is provided a kit of parts comprising first and second support portions of the kind heretofore mentioned, said support portions being able to be mounted to a rotatable shaft and cooperate in order to hold a cutting disc at an oblique angle relative to the rotatable shaft and also each having a locking feature for restricting relative rotation between the first and second support portions. In particular, the first and second support portions each comprise an opening through which the first and second support portions are mounted to the rotatable shaft.

According to an aspect of the present invention there is provided a power tool for forming a channel in a concrete work surface comprising: a first section carrying a rotatable shaft extending along a shaft axis; at least one cutting element mounted on the rotatable shaft and defining a substantially circular blade; and a second section for engaging the work surface, the first section being movable relative to the second section such that the at least one cutting element can be moved into and out of engagement with the work surface in use; wherein an active portion of the periphery of the at least one cutting element, being the part of the periphery furthest from the rotatable shaft in the direction of the work surface, oscillates along an axis parallel to the shaft axis when the shaft rotates, and wherein the cutting element has a body defining an opening for receiving the rotatable shaft the opening extending between opposite end surfaces of the body which are each in a plane perpendicular to the shaft axis, the cutting element also having a substantially circular blade integrally formed with the body at an oblique angle relative to the shaft axis.

According to an aspect of the present invention there is provided a cutting element for forming a channel in a concrete work surface when rotatably driven by a rotatable shaft of a power tool, the cutting element comprising a body defining an opening for receiving the rotatable shaft the opening extending between opposite end surfaces of the body which are each in a plane perpendicular to the shaft axis, the cutting element also having a substantially circular blade integrally formed with the body at an oblique angle relative to the shaft axis.

Other aspects of the present disclosure are as follows.

According to an aspect of the present disclosure there is provided a power tool for forming a channel in a work surface, comprising: a first section carrying a rotatable shaft extending along a shaft axis; at least one cutting element mounted on the rotatable shaft and defining a substantially circular blade; and a second section for engaging the work surface, the first section being movable relative to the second section such that the at least one cutting element can be moved into and out of engagement with the work surface in use; wherein an active portion of the periphery of the at least one cutting element, being the part of the periphery furthest from the rotatable shaft in the direction of the work surface, oscillates along an axis parallel to the shaft axis when the shaft rotates.

The or each respective cutting element may be a cutting disc mounted on the shaft at an oblique angle relative to the shaft axis.

A said cutting disc may be fixed relative to the rotatable shaft by clamping the cutting disc between a first support portion and a second support portion on opposite sides of the cutting disc, wherein the first and second support portions cooperate to hold the cutting disc at said oblique angle relative to the shaft axis.

Both the first and second support portions may each have an end surface for supporting the cutting disc and another end surface distal from the cutting disc which is in a plane perpendicular to the shaft axis.

A first said cutting disc may be mounted at a first oblique angle relative to the shaft axis and a second said cutting disc may be mounted at a second oblique angle relative to the shaft axis.

The modulus of the angles at which the first and second cutting discs are mounted relative to the shaft axis may be substantially identical but such cutting discs slope in different directions relative to each other.

The first cutting disc may be fixed relative to the rotatable shaft by clamping the first cutting disc between a first support portion and a second support portion which cooperate to hold the first cutting disc at said first oblique angle relative to the shaft axis, whereas the second cutting disc may be fixed relative to the rotatable shaft by clamping the second cutting disc between the second support portion and a third support portion which cooperate to hold the second cutting disc at said second oblique angle relative to the shaft axis.

Both the first and third support portions may each have an end surface for supporting the respective cutting disc in engagement therewith and another end surface distal from said cutting disc which is in a plane perpendicular to the shaft axis.

The cutting element may have a body defining an opening for receiving the rotatable shaft the opening extending between opposite end surfaces of the body which are each in a plane perpendicular to the shaft axis, the cutting element also having a substantially circular blade integrally formed with the body at an oblique angle relative to the shaft axis.

According to another aspect of the present disclosure there is provided a kit of parts comprising a plurality of support portions for mounting to a rotatable shaft of a power tool according to any aspect or arrangement heretofore described in order to support at least one cutting disc at an oblique angle relative to the shaft axis.

The kit of parts may comprise a first support portion and a second support portion for mounting to the rotatable shaft for clamping a said cutting disc also mounted to the rotatable shaft therebetween from opposite sides, wherein the first and second support portions cooperate to hold the cutting disc at said oblique angle relative to the shaft axis.

Both the first and second support portions may each have an end surface for supporting the cutting disc and another end surface distal from the cutting disc which is in a plane perpendicular to the shaft axis.

The kit of parts may be configured to support a first cutting disc at a first oblique angle relative to the shaft axis and to support a second cutting disc at a second oblique angle relative to the shaft axis.

The kit of parts may be configured such that in use the modulus of the angles at which the first and second cutting discs are supported relative to the shaft axis are substantially identical but such cutting discs slope in different directions relative to each other.

The kit of parts may comprise first, second and third support portions wherein in use the first cutting disc is fixed relative to the rotatable shaft by clamping the first cutting disc between the first support portion and the second support portion which cooperate to hold the first cutting disc at said first oblique angle relative to the shaft axis, whereas the second cutting disc is fixed relative to the rotatable shaft by clamping the second cutting disc between the second support portion and the third support portion which cooperate to hold the second cutting disc at said second oblique angle relative to the shaft axis.

Both the first and third support portions may each have an end surface for supporting the respective cutting disc in engagement therewith and another end surface distal from said cutting disc which is in a plane perpendicular to the shaft axis.

According to a further aspect of the present disclosure there is provided a cutting element for forming a channel in a work surface when rotatably driven by a rotatable shaft of a power tool, the cutting element comprising a body defining an opening for receiving the rotatable shaft the opening extending between opposite end surfaces of the body which are each in a plane perpendicular to the shaft axis, the cutting element also having a substantially circular blade integrally formed with the body at an oblique angle relative to the shaft axis.

BRIEF DESCRIPTION OF THE DRAWINGS

Various aspects and embodiments of the invention will now be described by way of non-limiting example with reference to the accompanying drawings, in which.

DESCRIPTION OF THE INVENTION

Figure 1:
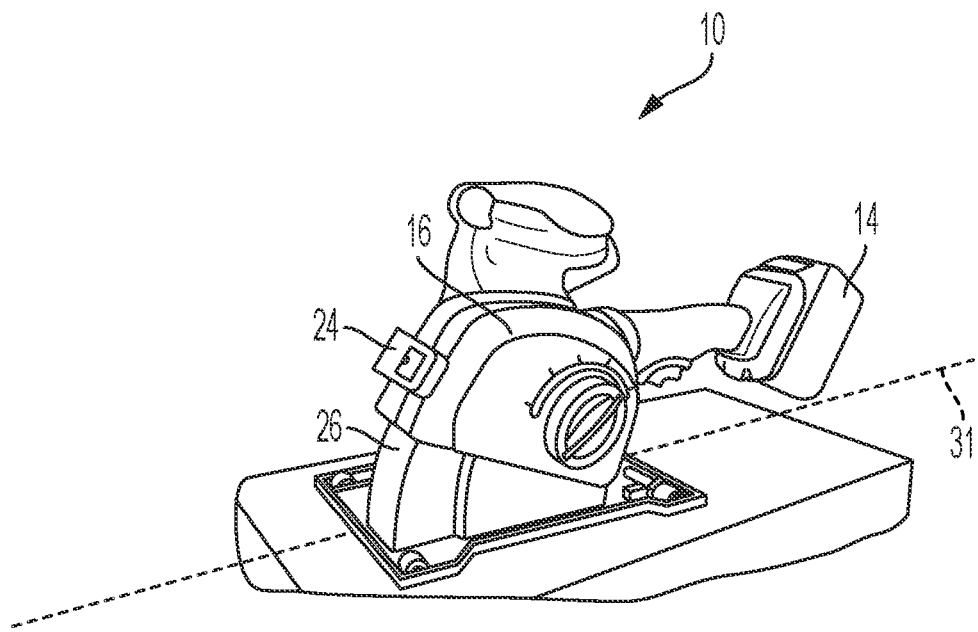
FIG. 1 illustrates a wall chaser power tool on a work surface.
Figure 2:
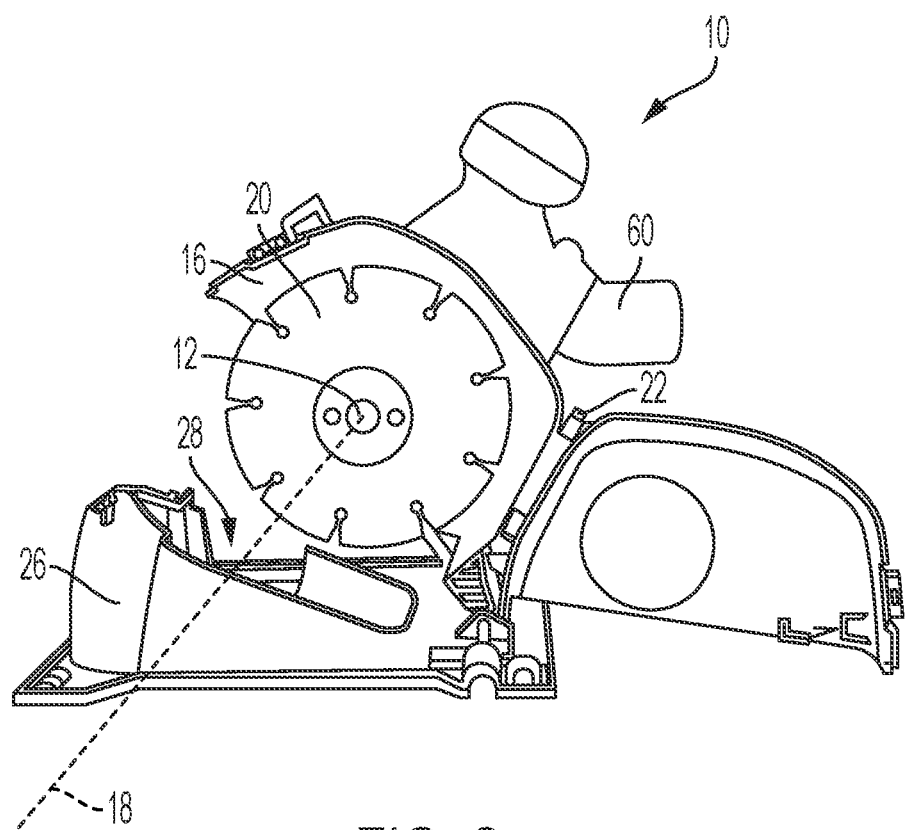
FIG. 2 illustrates the wall chaser power tool of FIG. 1 in an open configuration.

An example power tool for forming a channel in a concrete work surface is a wall chaser tool 10 illustrated in FIGS. 1 and 2. The wall chaser tool 10 has various onboard electronics, including an electric motor for driving a rotatable shaft 12 and a battery 14 for providing electrical power. An upper section 16 of the wall chaser tool 10 carries the rotatable shaft 12, which extends along a shaft axis 18. A cutting disc 20 is mounted on the rotatable shaft 12. The upper section 16 of the wall chaser tool 10 is illustrated in an open configuration in FIG. 2 to facilitate cutting disc replacement but can be closed by pivoting respective parts of the upper section 16 about the hinge 22 and securing them relative to each other using the locking feature 24.

A lower section 26 of the wall chaser tool 10 engages the concrete work surface in use, the upper section 16 being movably mounted relative to the lower section 26 about a pivot connection. The cutting disc 20 can be moved into and out of engagement with the work surface in use. In particular with reference to FIG. 2 after the upper section 16 is closed and the rotatable shaft 12, and thus the cutting disc 20, are caused to rotate the upper section 16 is moved towards the lower section 26. More specifically the upper section 16 is pivoted towards the lower section 26 against biasing means such as a spring urging the lower and upper sections 26, 16 apart (e.g. compression or wire spring). The rotating cutting disc 20 is caused to extend through an opening 28 defined by the lower section 26 into contact with the concrete work surface. When downwards force from a user is removed then the biasing means causes the cutting disc 20 to be moved out of contact with the concrete work surface. During tool use a vacuum device can be connected to a shroud feature 60 for sucking away dust and debris generated by the tool in use.

When the cutting disc 20 engages the concrete work surface in use a channel can be formed in the concrete work surface by a user moving the wall chaser tool 10 along the axis 31 illustrated in FIG. 1. Unlike with prior wall chasers, a channel suitable for installing cables, wires etc. can be formed using a single cutting disc 20 due to the specific manner in which the cutting disc 20 is mounted on the rotatable shaft 12.

Figure 3:
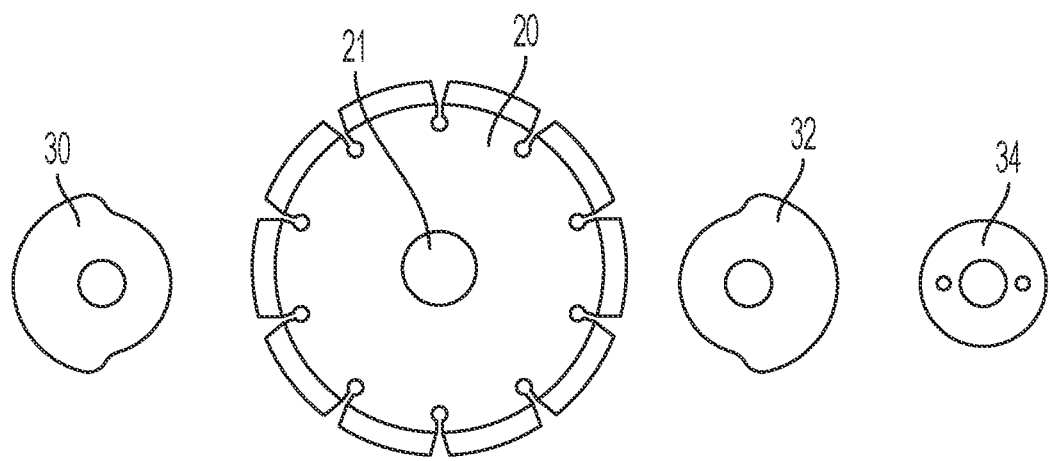
FIG. 3 illustrates a spacer set of a first embodiment adjacent a cutting disc and nut.
Figure 4:
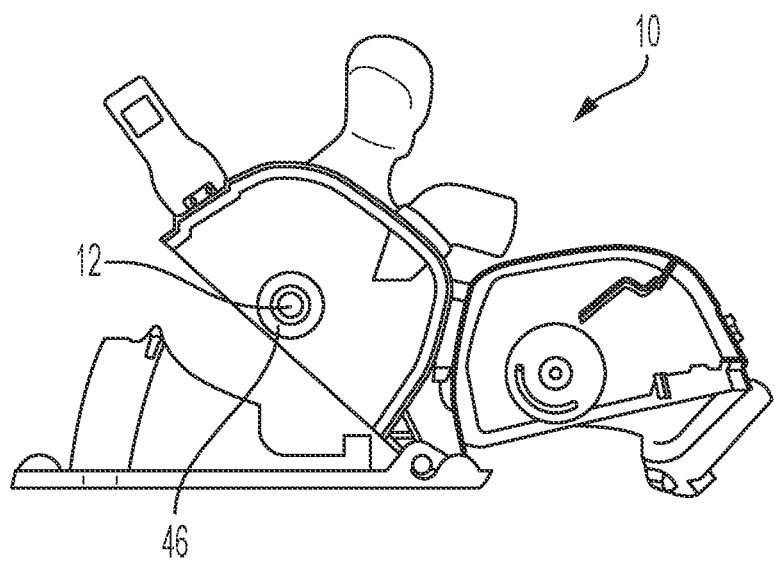
FIG. 4 illustrates the wall chaser power tool of FIG. 2 without a cutting disc.

With reference to FIGS. 3 and 4 the cutting disc 20 is fixed to the rotatable shaft 12 by clamping it between a pair of support portions 30, 32 which cooperate to support the cutting disc 20 at an oblique angle relative to rotatable shaft 12. The support portions 30, 32 are forced against the cutting disc 20, and thus clamp it therebetween, by screwing a nut 34 onto the rotatable shaft 12 and tightening it to clamp against one of the support portions. More specific details of how the cutting disc 20 and support portions 30, 32 are mounted to the rotatable shaft 12 are provided in due course, however, first some specific details of the support portions 30,32 is provided.

Figure 5:
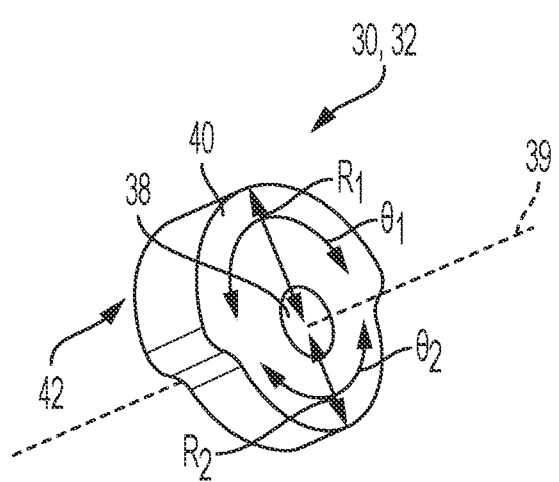
FIG. 5 is a perspective view of one of the spacers in FIG. 3.
Figure 6:
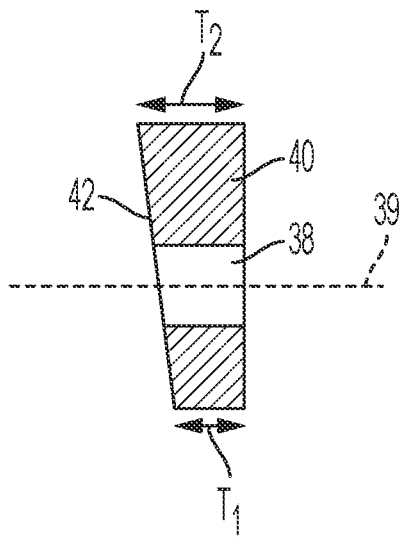
FIG. 6 is a cross-sectional view of the spacer in FIG. 5.

FIG. 5 illustrates one of the support portions 30, 32, although both support portions 30, 32 have the same shape. A cross-sectional view is illustrated in FIG. 6. The support portions 30, 32 define an opening 38 for receiving the rotatable shaft 12 in use. The extent of clearance between the outer surface of the rotatable shaft 12 and the inner surface of the opening 38 should be as small as possible, preferably requiring the support portions 30, 32 to be pushed along the rotatable shaft 12 by a user during a set up process against the force of friction arising between the outer surface of the rotatable shaft 12 and the inner surface of the opening 38. However in view of the disclosure herein, persons skilled in the art will nevertheless appreciate that the technical effect of supporting a cutting disc 20 at an oblique angle can still be achieved if a degree of clearance exists between the outer surface of the rotatable shaft 12 and the inner surface of the opening 38 provided that vibrations experienced by the rotatable shaft 12 in use are within acceptable limits, such vibrations being caused by the features mounted to the rotatable shaft 12.

With further reference to FIG. 5 the opening 38 extends along an axis denoted 39. A first end surface 40 of the support portions 30, 32 is substantially perpendicular relative to the axis 39. A second end surface 42 of the support portions 30, 32 is at an oblique angle relative to the axis 39.

Around substantially a first angular extent $\theta_1$ of the periphery of the support portions 30, 32 the radius is denoted $R_1$. Around substantially a second angular extent $\theta_2$ of the periphery of the support portions 30, 32 the radius is denoted $R_2$. Furthermore, the thickness at one end of the support portions 30, 32 is $T_1$ and at the other end $T_2$.

In an example embodiment the diameter of the opening D is 14.10 mm, $R_1$ is 27.50 mm, $R_2$ is 21.00 mm, $\theta_1$ is 180 degrees, $\theta_2$ is 180 degrees, $T_1$ is 11.54 mm, $T_2$ is 17.92 mm and the angle at which the second surface 42 is inclined relative to the axis 39 is 7.50 degrees. As will be discussed later on, other specific dimensions and angles are suitable provided that the extent of vibration induced in the rotatable shaft 12 during use of the wall chaser tool 10 is within acceptable limits.

The support portions 30, 32 are identical and the inclined second end surfaces 42 thereof cooperate in use to support the cutting disc 20 at an oblique angle. It will be appreciated that the oblique angle at which the cutting disc 20 is supported relative to the rotatable shaft 12 is the same as the angle at which the second surface 42 of the respective support portions 30, 32 is inclined relative to the axis 39 shown in FIG. 6. Thus, continuing with the specific example support portions 30, 32 having the dimensions outlined in the above paragraph, in use the cutting disc 20 will be supported at 7.50 degrees relative to the rotatable shaft 12.

FIG. 4 illustrates the wall chaser tool 10 in an open configuration to facilitate cutting disc replacement. The rotatable shaft 12 carries a flange 46 which is fixed relative to the shaft 12. In some embodiments the flange 46 can be formed as an integral part of the rotatable shaft 12. When the rotatable shaft 12 is driven by the aforementioned electric motor to rotate so does the flange 46. Essentially the purpose of the flange 46 is so that features mounted on the rotatable shaft 12 do not scrape against the inside of the wall chaser housing in use.

Figure 7:
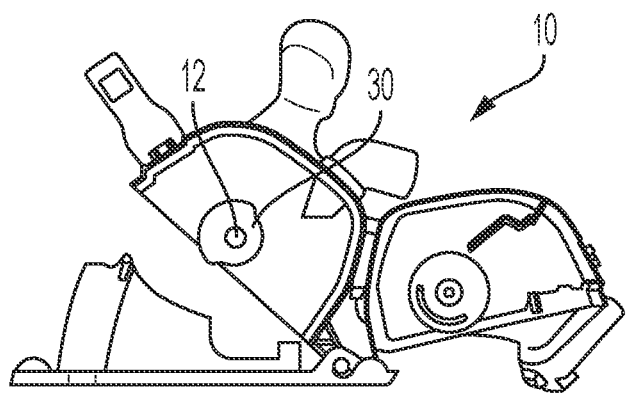
FIG. 7 illustrates an initial stage of mounting the features in FIG. 3 to the wall chaser power tool of FIG. 2.
Figure 8:
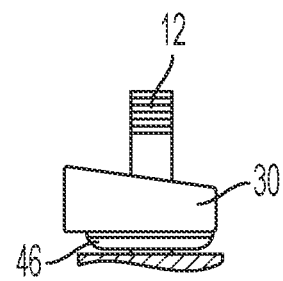
FIG. 8 illustrates an initial stage of mounting the features in FIG. 3 to the wall chaser power tool of FIG. 2.

During a cutting disc 20 mounting operation, initially a first support portion 30 is mounted on the rotatable shaft 12 as illustrated in FIGS. 7 and 8. In particular the first support portion 30 is manipulated such that the opening 38 is caused to extend around the rotatable shaft 12 and it is moved into contact with the flange 46.

Figure 9:
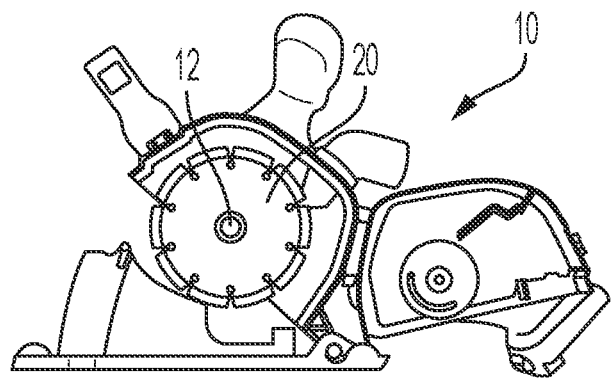
FIG. 9 illustrates a next stage of mounting the features in FIG. 3 to the wall chaser power tool of FIG. 2.
Figure 10:
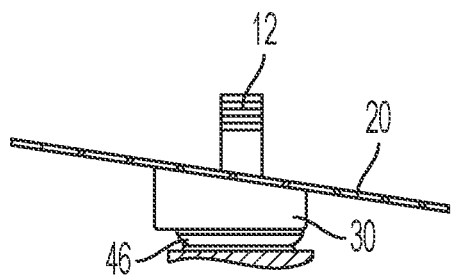
FIG. 10 illustrates a next stage of mounting the features in FIG. 3 to the wall chaser power tool of FIG. 2.

In a next step the cutting disc 20 is mounted on the rotatable shaft 12 as illustrated in FIGS. 9 and 10. Cutting discs 20 typically come in a standard size, thereby having a standard size circular opening 21 through their centre (see FIG. 3) and are commercially available, for example the DEWALT® DT90294-QZ. The cutting disc 20 is manipulated such that the circular opening 21 through its centre is caused to extend around the rotatable shaft 12 and the cutting disc 20 is moved into contact with the second end surface 42 of the first support portion 30. Since the second end surface 42 of the first support portion 30 is at an oblique angle relative to the rotatable shaft 12 (in this specific example 7.50 degrees relative to the rotatable shaft 12) the cutting disc 20 is supported under gravity at the same oblique angle relative to the rotatable shaft 12 as in FIG. 10.

Figure 11:
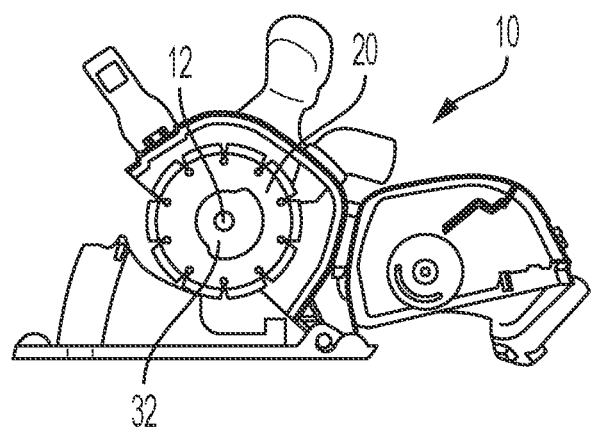
FIG. 11 illustrates a next stage of mounting the features in FIG. 3 to the wall chaser power tool of FIG. 2
Figure 12:
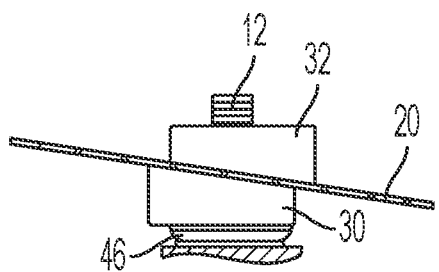
FIG. 12 illustrates a next stage of mounting the features in FIG. 3 to the wall chaser power tool of FIG. 2
Figure 13:
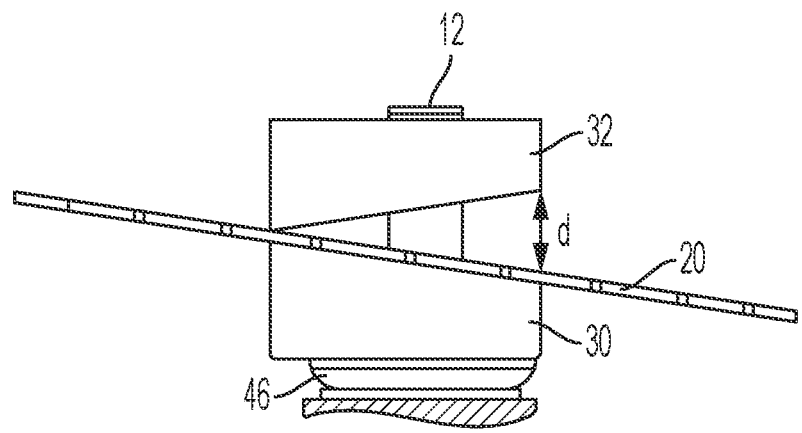
FIG. 13 illustrates what happens if the spacers in FIG. 3 are not mounted to the rotatable shaft of the wall chaser power tool in FIG. 2 in the correct orientation.

Next a second support portion 32 is mounted on the rotatable shaft 12 as illustrated in FIGS. 11 and 12. In particular the second support portion 32 is manipulated such that the opening 38 is caused to extend around the rotatable shaft 12 and the second end surface 42 thereof is moved into contact with the cutting disc 20. A gap denoted d in FIG. 13 is visible between the cutting disc 20 and the second end surface 42 if the rotational orientation of the second support portion 32 relative to the first support portion 30 is not correct, whereas when the rotational orientation of the second support portion 32 relative to the first support portion 30 is correct the second end surface 42 of the second support portion 32 lies flush against the cutting disc 20.

At this stage the cutting disc 20 is engaged by the second end surfaces 42 of both support portions 30, 32 which are inclined relative to the rotatable shaft 12, in this example at 7.50 degrees, thereby providing that the cutting disc 20 is supported at the same angle relative to the rotatable shaft 12.

Figure 14:
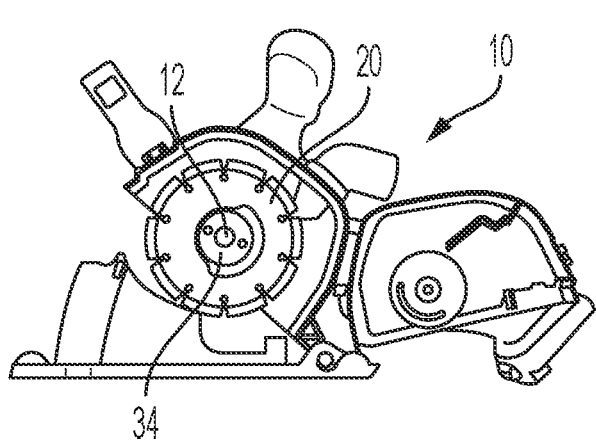
FIG. 14 illustrates the final stages of mounting the features in FIG. 3 to the wall chaser power tool in FIG. 2.
Figure 15:
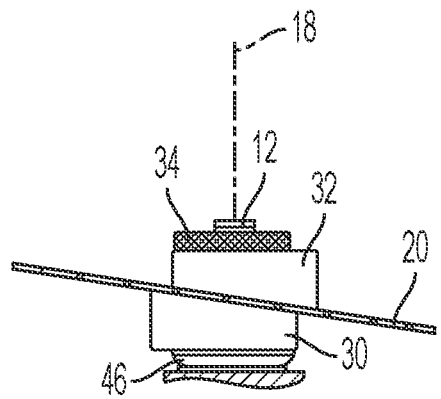
FIG. 15 illustrates the final stages of mounting the features in FIG. 3 to the wall chaser power tool in FIG. 2

Next the nut 34 is threadably engaged with the rotatable shaft 12 as illustrated in FIGS. 14 and 15. As the nut 34 is threaded onto the rotatable shaft 12 it moves along the shaft axis 18 towards the flange 46, thereby causing the support portions 30, 32 and cutting disc 20 to be progressively clamped tighter between the nut 34 and flange 46 as the nut 34 is wound further onto the rotatable shaft 12. As a result, the support portions 30, 32 and cutting disc 20 are fixed relative to the rotatable shaft 12 such that they rotate with the shaft 12 when the shaft 12 is rotatably driven. Clamping the cutting disc 20 between the support portions 30, 32 enables the cutting disc to be supported at an oblique angle relative to the rotatable shaft 12.

Figure 16:
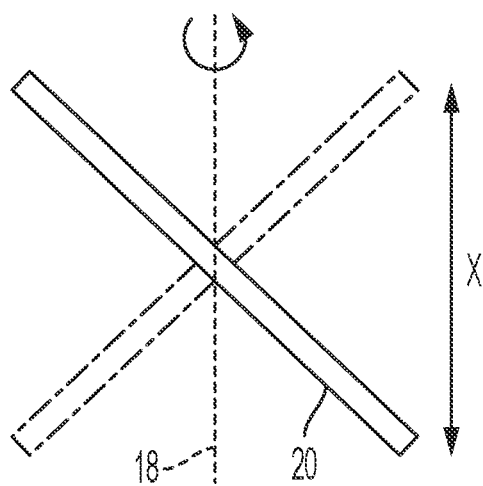
FIG. 16 is a schematic view of the cutting disc in FIG. 15 rotating in use.

FIG. 16 is a schematic illustration of the cutting disc 20 rotating about the shaft axis 18 of the rotatable shaft 12 during use of the wall chaser 10. At one instant the cutting disc 20 slopes from top-left to bottom-right of the illustration but after rotating 180 degrees the cutting disc slopes from top-right to bottom-left (shown in dotted lines). It will thus be appreciated that when mounted in the wall chaser tool 10 an active portion of the periphery of the cutting disc 20, being the part of the periphery furthest from the rotatable shaft 12 in the direction of the concrete work surface, oscillates along an axis parallel to the shaft axis 18 when the rotatable shaft 12 rotates. The extent of such oscillation is denoted X in FIG. 16. The width of a channel capable of being produced in a concrete work surface by the wall chaser 10 when it is moved along the axis 31 in FIG. 1 is thus the distance X, which is wider than the thickness of the cutting disc 20. The chiselling step of the traditional method of forming a channel in a concrete work surface outlined in the background section is thus removed and so the overall efficiency of a construction process is improved.

Persons skilled in the art will appreciate the theory of unbalance, in particular the concepts of static unbalance, couple unbalance and dynamic unbalance. An object fixed to a rotating shaft will cause the shaft to rotate if the combination of such features is not balanced, that is if it does not have each of static balance, couple balance and dynamic balance. It is known that in an unbalanced system e.g. if rotation of a shaft having mass fixed thereto causes the shaft to vibrate, then the re-distribution of mass about the axis of rotation can achieve balance.

With reference to the system heretofore described, in particular with reference to FIGS. 5, 6 and 15 it has been found that clamping the support portions 30, 32 at 180 degrees relative to each other on opposite sides of the cutting disc 20 limits vibrations experienced by the rotatable shaft 12 in use to be within acceptable limits, such vibrations being caused by the features mounted to the rotatable shaft 12.

Other suitable configurations are possible however for the support portions 30, 32.

For example, with further refence to FIGS. 5 and 6, the diameter of the opening D can be configured depending on the thickness of the rotatable shaft 12. The angle of the second end surface 42 relative to the axis 39 can be configured depending on the required degree of obliqueness. Additionally, there is freedom to vary any of the other dimensions $R_1$, $R_2$, $\theta_1$, $\theta_2$ $T_1$ and $T_2$. A change to any parameter mentioned in this paragraph will require modification to at least one of the other parameters in order to achieve the same level of balance in use before the change. As a result, therefore, persons skilled in the art will appreciate that other specific dimensions and angles are suitable provided that the extent of vibration induced in the rotatable shaft 12 during use of the wall chaser tool 10 is within acceptable limits.

Another example embodiment for the support portions is illustrated in FIGS. 17, 17A, 17B, 17C and 18. Each of first and second support portions 130, 132 have the same shape. The support portions 130, 132 define an opening 138 for receiving the heretofore described rotatable shaft 12 in use. The extent of clearance between the outer surface of the rotatable shaft 12 and the inner surface of the opening 138 should be as small as possible, preferably requiring the support portions 130, 132 to be pushed along the rotatable shaft 12 by a user during a set up process against the force of friction arising between the outer surface of the rotatable shaft 12 and the inner surface of the opening 138. However in view of the disclosure herein, persons skilled in the art will nevertheless appreciate that the technical effect of supporting a cutting disc 20 at an oblique angle can still be achieved if a degree of clearance exists between the outer surface of the rotatable shaft 12 and the inner surface of the opening 138 provided that vibrations experienced by the rotatable shaft 12 in use are within acceptable limits, such vibrations being caused by the features mounted to the rotatable shaft 12. The opening 138 extends along an axis denoted 139. A first end surface 140 of the support portions 130, 132 is substantially perpendicular relative to the axis 139. A second end surface 142 of the support portions 130, 132 is at an oblique angle relative to the axis 139. Three projections 144a to 144c are evenly circumferentially distributed around the opening 138 and extend from the second end surface 142 along a direction parallel with the axis 139. Furthermore, the first and second support portions 130, 132 define a fin 145 so that more mass is located on one side of the axis 139 than the other. In other words, such that more mass is located below the axis 139 illustrated in FIG. 17 than is located above the axis 139. The fin 145 progressively increases in width along a direction extending from a first side of the fin 145 (the front end face thereof, visible in FIG. 17) to a second side of the fin 145 (the rear end face thereof, not visible in FIG. 17).

In an example embodiment the height h of the support portions 130, 132 (measured from the top of the fin 145 to the opposite edge of the support portion) is 48.5 mm, the thickness $T_1$ at the side opposite the fin 145 is 12.42 mm, the length $T_2$ of the fin 145 is 18.72 mm, the height $h_f$ of the fin 145 is 6.5 mm, the thickness of the fin $T_{f1}$ at the end adjacent the first side of the fin 145 (the front end face thereof, visible in FIG. 17) is 8.4 mm, the thickness of the fin $T_{f2}$ at the other end adjacent the second side of the fin 145 (the rear end face thereof, not visible in FIG. 17) is 30.98 mm, the diameter d of the opening is 14.1 mm, the length of the three projections 144a to 144c are 4.5 mm, 3 mm, and 3 mm respectively. The angle at which the second surface 140 is inclined relative to the axis 139 is 7.50 degrees. Also, a circumferential depression 147 is located in the first end surface 140 surrounding the opening 139, wherein the depression has a radius $R_d$ of 11.5 mm and depth $T_d$ of 1.5 mm.

Figure 17:
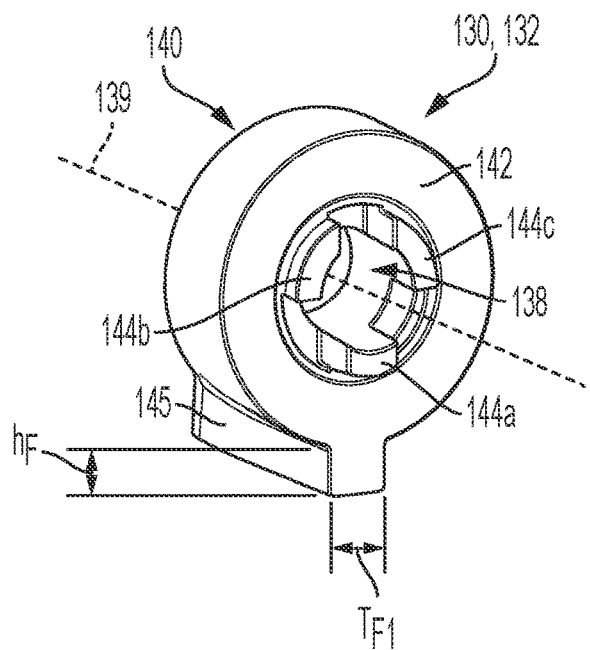
FIGS. 17, 17A, 17B and 17C illustrate perspective, bottom, front and side views respectively of a spacer according to another embodiment.
Figure 17A:
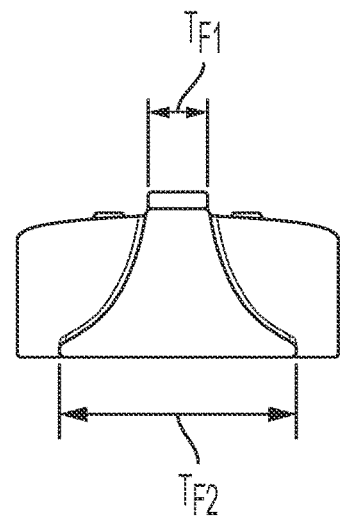
Figure 17B:
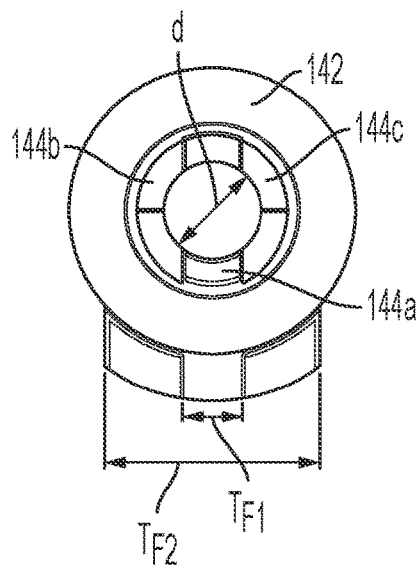
Figure 17C:
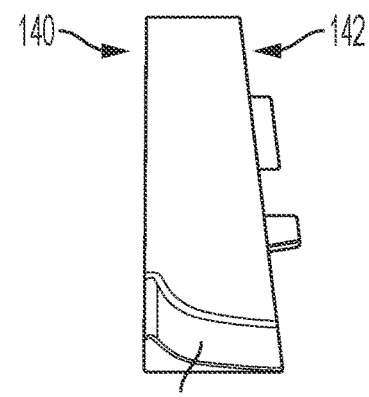
Figure 18:
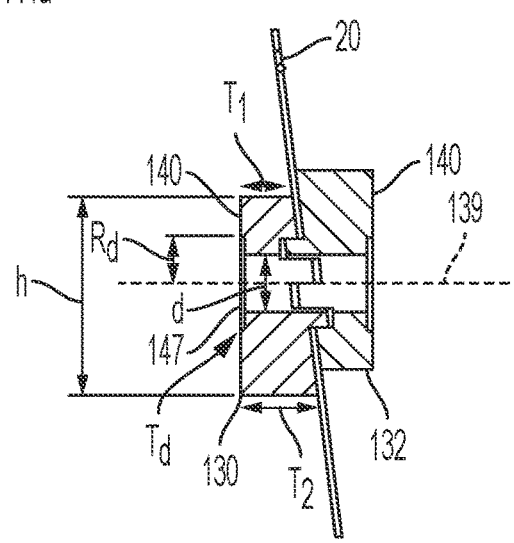
FIG. 18 is a cross-sectional view of a pair of spacers according to FIG. 17 clamping a cutting disc therebetween.

Looking at FIG. 18, in use the first support portion 130 is located on the rotatable shaft 12 of the wall chaser 10 such that the first end surface 140 engages the flange 46. The cutting disc 20 is next mounted on the shaft 12 such that it rests against the inclined second end surface 142 of the first support portion 130. Next the second support portion 132 is mounted on the shaft 12, whereby it is rotationally offset 180 degrees relative to the first support portion 130 to enable the projections 144a to 144c of the respective support portions 130, 132 extending through the circular opening 21 in the cutting disc 20 to interlock and to enable the inclined second end surface 142 of the second support portion 132 to lie flush against the cutting disc 20. At this stage the cutting disc 20 is engaged by the second end surfaces 142 of both support portions 130, 132 which are inclined relative to the rotatable shaft 12, in this example at 7.50 degrees, thereby providing that the cutting disc 20 is supported at the same angle relative to the rotatable shaft 12. Interlocking of the projections 144a to 144c of the respective support portions 130, 132 prevents rotation of the first and second support portions 130, 132 relative to each other which improves stability in use. With continuing reference to FIGS. 17B and 18 the projection 144a extends further from the first end surface 140 than the other projections 144b, 144c. If a user mounted one of the support portions 130, 132 backwards then the projections 144a to 144c of the correctly mounted support portion would prevent the support portions from clamping a cutting disc 20 between them. For example, looking at FIG. 18, if the support portion 132 was mounted backwards then the projection 144a of the support portion 130 would interact with the rear side of the support portion 132 and thus block the support portions 130, 132 from clamping the cutting disc 20 between them, which improves safety because users will easily see if a disc 20 is not mounted correctly.

Next the nut 34 is threadably engaged with the rotatable shaft 12 as heretofore described, thereby causing the support portions 130, 132 and cutting disc 20 to be progressively clamped tighter between the nut 34 and flange 46 as the nut 34 is wound further onto the rotatable shaft 12. As a result, the support portions 130, 132 and cutting disc 20 are fixed relative to the rotatable shaft 12 such that they rotate with the rotatable shaft 12 when the shaft 12 is rotatably driven. Clamping the cutting disc 20 between the support portions 130, 132 enables the cutting disc to be supported at an oblique angle relative to the rotatable shaft and to achieve the oscillation effect heretofore described in relation to FIG. 16 for forming a channel.

With reference to the example embodiment described in relation to FIGS. 17, 17A, 17B, 17C and 18 it has been found that clamping the support portions 130, 132 at 180 degrees relative to each other on opposite sides of the cutting disc 20 limits vibrations experienced by the rotatable shaft 12 in use to be within acceptable limits, such vibrations being caused by the features mounted to the rotatable shaft 12. Having the support portions 130, 132 extend through the opening 21 of the cutting disc 20 and interlock with each other prevents the support portions 130, 132 from becoming rotationally offset relative to each other in use, which would if this were to occur increase the extent of vibrations imparted to the rotatable shaft 12 during use.

It will be appreciated that other configurations are possible for the support portions 130, 132 provided that the extent of vibration induced in the rotatable shaft 12 during use of the wall chaser tool 10 is within acceptable limits. For example, the diameter of the opening 138 can be configured depending on the thickness of the rotatable shaft 12. The angle of the second end surface 142 can be configured depending on the required degree of obliqueness. Additionally there is freedom to vary any of the other dimensions including: the height h of the support portions 130, 132 (measured from the top of the fin 145 to the opposite edge of the support portion), the thickness $T_1$ at the side opposite the fin 145, the length $T_2$ of the fin 145, the height $h_f$ of the fin 145, the thickness of the fin $T_{f1}$ at the end adjacent the first side of the fin 145 (the front end face thereof, visible in FIG. 17), the thickness of the fin $T_{f2}$ at the other end adjacent the second side of the fin 145 (the rear end face thereof, not visible in FIG. 17), the length of the three projections 144a to 144c. Also dimensions of the circumferential depression 147 located in the first end surface 140 surrounding the opening 138 can be varied including radius $R_d$ and even the depth $T_d$ can range as far as 0 mm (in other words in some embodiments the circumferential depression 147 is absent from the support portions 130, 132 and the first end surfaces 140 of the support portions 130, 132 engage the flange 46 and nut 34 respectively in use). A change to any parameter mentioned in this paragraph will require modification to at least one of the other parameters in order to achieve the same level of balance in use before the change. As a result, therefore, persons skilled in the art will appreciate that other specific dimensions and angles are suitable provided that the extent of vibration induced in the rotatable shaft 12 during use of the wall chaser tool 10 is within acceptable limits.

Figure 19:
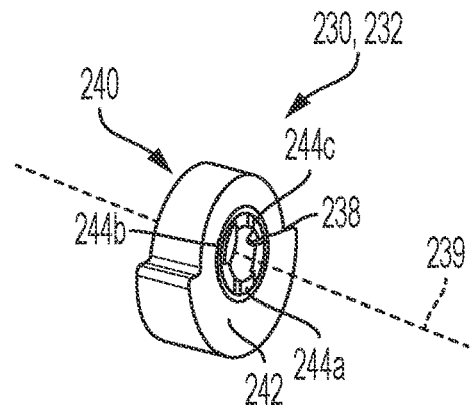
FIG. 19 illustrates a spacer according to another embodiment.

A further embodiment for the support portions is illustrated in FIG. 19. Each of first and second support portions 230, 232 has a configuration essentially similar to that heretofore described in relation to FIGS. 5 and 6, except the support portions 230, 232 have a plurality of projections 244a to 244c circumferentially arranged around the opening 238 and extending from the inclined second end surface 242 thereof similar to those projections 144a to 144c already described in relation to FIGS. 17 and 18. In light of the foregoing disclosure it will be appreciated that a cutting disc 20 can be supported at an oblique angle relative to the rotatable shaft 12 of a wall chaser tool 10 by clamping the cutting disc 20 between opposing inclined second end surfaces 242 of the support portions 230, 232 in a like manner to that already described in relation to FIG. 18, whereby the projections 244a to 244c of the support portions 230, 232 extend through the circular opening 21 of the cutting disc 20 for interlocking with each other. Interlocking of the projections 244a to 244c of the respective support portions 230, 232 prevents rotation of the first and second support portions 230, 232 relative to each other which improves stability in use. With continuing reference to FIGS. 18 and 19 the projection 244a extends further from the first end surface 240 than the other projections 244b, 244c. If a user mounted one of the support portions 230, 232 backwards then the projections 244a to 244c of the correctly mounted support portion would prevent the support portions from clamping a cutting disc 20 between them. For example, if the support portion 232 was mounted backwards then the projection 244a of the support portion 230 would interact with the rear side of the support portion 232 and thus block the support portions 230, 232 from clamping the cutting disc 20 between them, which improves safety because users will easily see if a disc 20 is not mounted correctly.

It is envisaged that more than one cutting disc 20 can be mounted on the rotatable shaft 12 of the aforementioned wall chaser tool 10 at an oblique angle.

Figure 20:
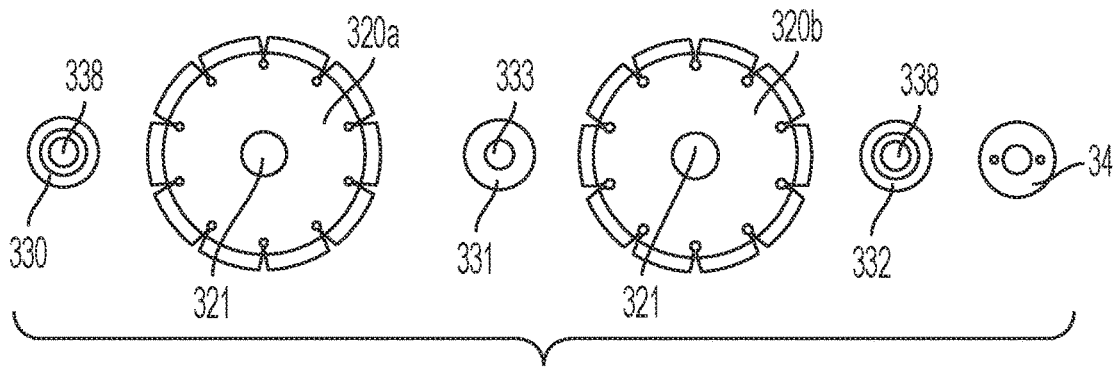
FIG. 20 illustrates a spacer set of a further embodiment adjacent a pair of cutting discs and a nut.
Figure 21:
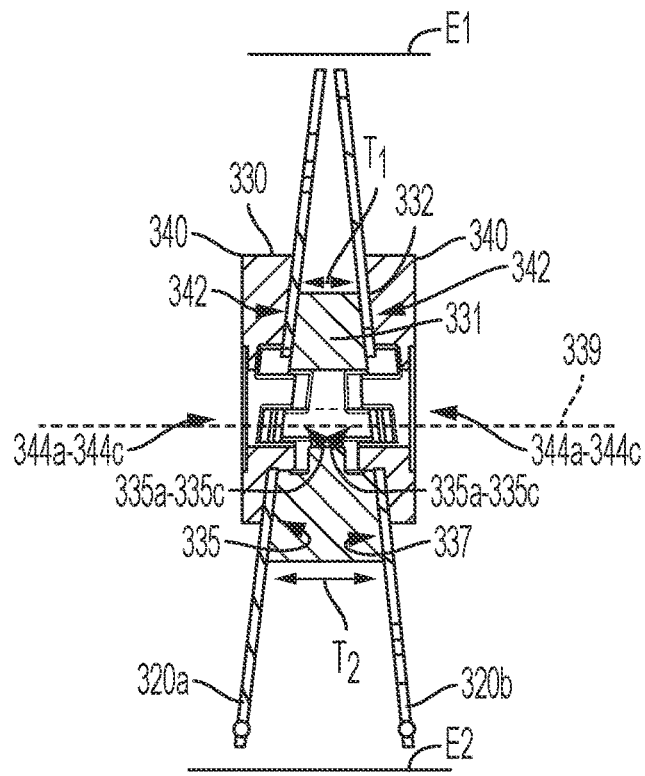
FIG. 21 is a cross-sectional view of the spacers in FIG. 20 clamping a pair of cutting discs therebetween.

With reference to FIGS. 20 and 21 a pair of cutting discs 320a, 320b (similar to the cutting disc 20 heretofore described up to now) can be fixed to the rotatable shaft 12 of the wall chaser 10 by clamping the first cutting disc 320a between first and second support portions 330, 331 and by clamping the second cutting disc 320b between the second support portion 331 and a third support portion 332. The first and third support portions 330, 332 can have a similar configuration to the support portions described in relation to FIGS. 17, 17A, 17B, 17C and 18, however with dimensions appropriate for maintaining vibrations induced in the rotatable shaft 12 within acceptable limits during use of the wall chaser tool 10 for the arrangement illustrated in FIGS. 21 and 32. As such multiple specific configurations are feasible. In FIGS. 20 and 21 features corresponding to those in FIGS. 17, 17A, 17B, 17C and 18 are labelled with like reference numerals to them used in those Figs. but increased by 200.

The second support portion 331 defines an opening 333 for receiving the rotatable shaft 12 of the wall chaser. A set of projections 335a to 335c are arranged around the opening 333 on both sides of the second support portion 331 and extend away from the respective first and second end surfaces 335, 337 of the second support portion 331. These projections 335a to 335c on each side of the second support portion 331 are configured to interlock with the projections 344a to 344c of the adjacent first or third support portion 330, 332 in use.

The second support portion 331 has a circular cross section but progressively changes in thickness from a thickness $T_1$ at one end to a thickness $T_2$ at the other. With particular reference to FIG. 21 an axis 339 extends through the openings 338, 333 defined by the first, second and third support portions 330, 331, 332. The oppositely located first and second end surfaces 335, 337 of the second support portion 331 are inclined relative to this axis at an angle, which is the same angle at which the second end surface 342 of the adjacent first or third support portion 330, 332 is inclined relative to the axis 339. The modulus of the angle at which the first planar interface defined between the first and second support portions 330, 331 slopes relative to the axis 339 is the same as the modulus of the angle at which the second planar interface defined between the second and third support portions 331, 332 slopes relative to the axis 339. However the first and second planar interfaces described in the prior sentence slope in opposite directions, which provides that when first and second cutting discs 320a, 320b are located within the first and second planar interfaces (and thus clamped between the support portions 330, 331, 332) at one end E1 of the cutting discs 320a, 320b the cutting discs 320a, 320b are closer together than at an opposite end E2 of the cutting discs 320a, 320b. This provides that in use, when the arrangement in FIG. 21 is fixed to the rotatable shaft 12 of the wall chaser tool 10, due to the oscillation effect of each cutting disc 320a, 320b already described in relation to FIG. 16 the resulting channel that is capable of being formed is double the thickness compared to if only a single cutting disc is used.

How the arrangement described in relation to FIGS. 20 and 21 can be fixed to the rotatable shaft 12 of the wall chaser 10 will now be described in detail.

Figure 22:
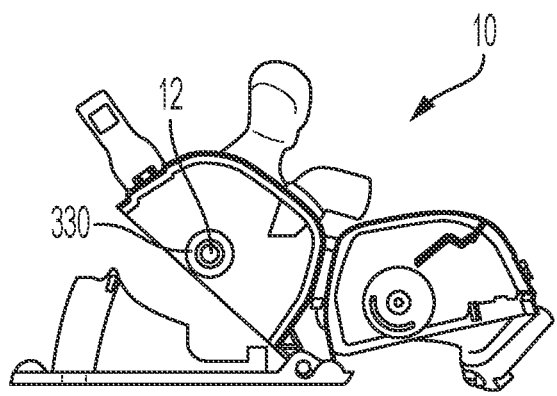
FIG. 22 illustrates an initial stage of mounting the features in FIG. 20 to the wall chaser power tool in FIG. 2.
Figure 23:
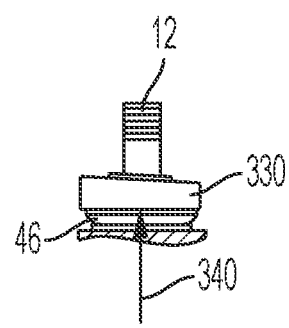
FIG. 23 illustrates an initial stage of mounting the features in FIG. 20 to the wall chaser power tool in FIG. 2.

During a cutting disc mounting operation, initially the first support portion 330 is mounted on the rotatable shaft 12 as illustrated in FIGS. 22 and 23. In particular the first support portion 330 is manipulated such that its opening 338 is caused to extend around the rotatable shaft 12 and the first end surface 340 thereof is moved into contact with the flange 46.

Figure 24:
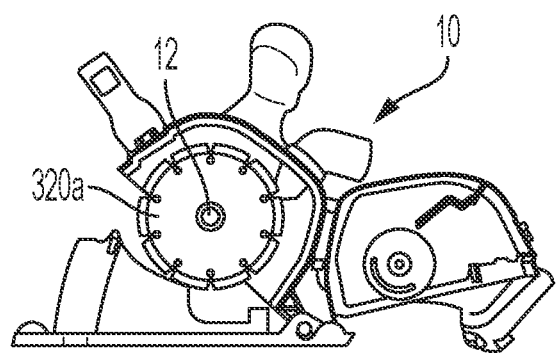
FIG. 24 illustrates a next stage of mounting the features in FIG. 20 to the wall chaser power tool in FIG. 2.
Figure 25:
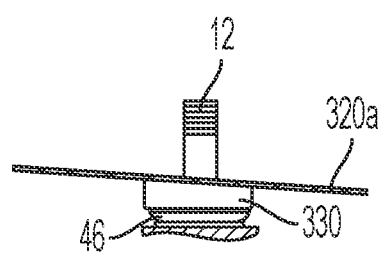
FIG. 25 illustrates a next stage of mounting the features in FIG. 20 to the wall chaser power tool in FIG. 2.

In a next step the first cutting disc 320a is mounted on the rotatable shaft 12 as illustrated in FIGS. 24 and 25. In particular the first cutting disc 320a is manipulated such that the opening 321 defined by the cutting disc (see FIG. 20) is caused to extend around the rotatable shaft 12 and the cutting disc 320a is moved into contact with the second end surface 342 of the first support portion 330. Since the second end surface 342 of the first support portion 330 is at an oblique angle relative to the rotatable shaft 12 the cutting disc 320a is supported at the same oblique angle relative to the rotatable shaft 12 as in FIG. 25.

Figure 26:
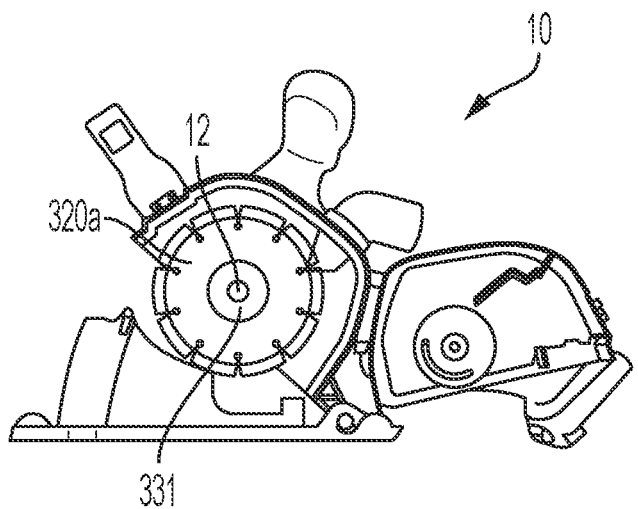
FIG. 26 illustrates a next stage of mounting the features in FIG. 20 to the wall chaser power tool in FIG. 2.
Figure 27:
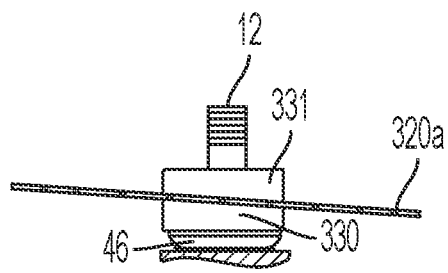
FIG. 27 illustrates a next stage of mounting the features in FIG. 20 to the wall chaser power tool in FIG. 2.

Next the second support portion 331 is mounted on the rotatable shaft 12 as illustrated in FIGS. 26 and 27. In particular the second support portion 331 is manipulated such that the opening 333 defined thereby (see FIG. 20) is caused to extend around the rotatable shaft 12 and the first end surface 335 thereof is moved into contact with the first cutting disc 320a. A gap similar to the gap denoted d in FIG. 13 will be visible between the first cutting disc 320a and the first end surface 335 if the rotational orientation of the second support portion 331 relative to the first support portion 330 is not correct, whereas when the rotational orientation of the second support portion 331 relative to the first support portion 330 is correct the first end surface 335 of the second support portion 331 lies flush against the first cutting disc 320a.

Figure 28:
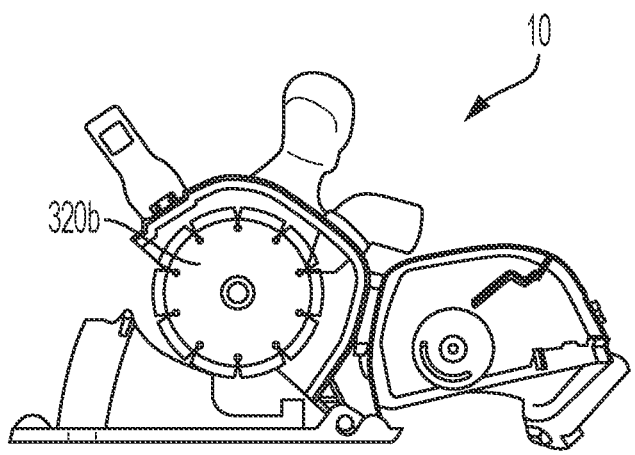
FIG. 28 illustrates a next stage of mounting the features in FIG. 20 to the wall chaser power tool in FIG. 2.
Figure 29:
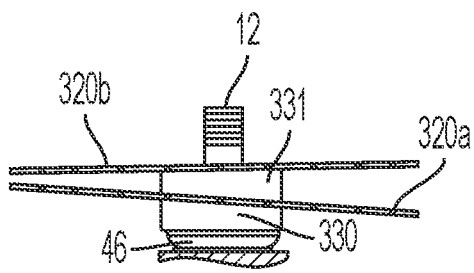
FIG. 29 illustrates a next stage of mounting the features in FIG. 20 to the wall chaser power tool in FIG. 2.

In a next step the second cutting disc 320b is mounted on the rotatable shaft 12 as illustrated in FIGS. 28 and 29. In particular the second cutting disc 320b is manipulated such that the opening 321 defined by the cutting disc (see FIG. 20) is caused to extend around the rotatable shaft 12 and the cutting disc 320b is moved into contact with the second end surface 337 of the second support portion 331. Since the second end surface 337 of the second support portion 331 is at an oblique angle relative to the rotatable shaft 12 the cutting disc 320b is supported at the same oblique angle relative to the rotatable shaft 12 as in FIG. 29.

Figure 30:
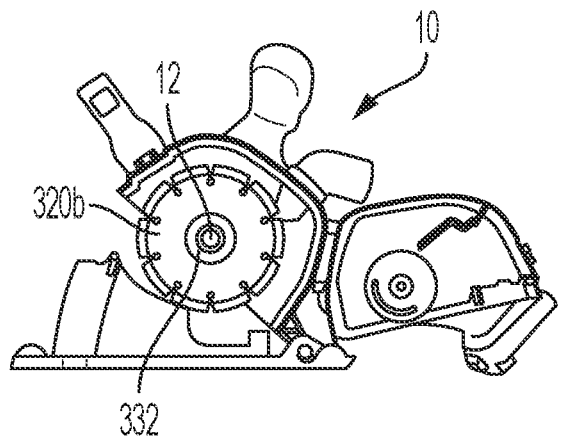
FIG. 30 illustrates a next stage of mounting the features in FIG. 20 to the wall chaser power tool in FIG. 2.
Figure 31:
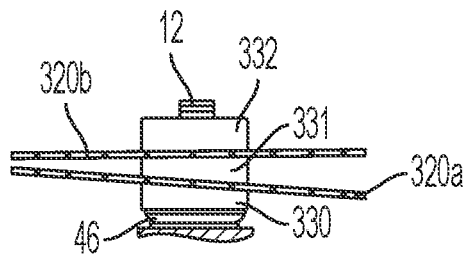
FIG. 31 illustrates a next stage of mounting the features in FIG. 20 to the wall chaser power tool in FIG. 2.

Next the third support portion 332 is mounted on the rotatable shaft 12 as illustrated in FIGS. 30 and 31. In particular the third support portion 332 is manipulated such that the opening 338 defined thereby (see FIG. 20) is caused to extend around the rotatable shaft 12 and the second end surface 342 thereof is moved into contact with the second cutting disc 320b. A gap similar to the gap denoted d in FIG. 13 will be visible between the second cutting disc 320b and the second end surface 342 if the rotational orientation of the third support portion 332 relative to the second support portion 331 is not correct, whereas when the rotational orientation of the third support portion 332 relative to the second support portion 331 is correct the second end surface 342 of the third support portion 332 lies flush against the second cutting disc 320b.

At this stage the first cutting disc 320a is located within the aforementioned first interface between the first and second support portions 330, 331 and the second cutting disc 320b is located within the aforementioned second interface between the second and third support portions 331, 332.

Figure 32:
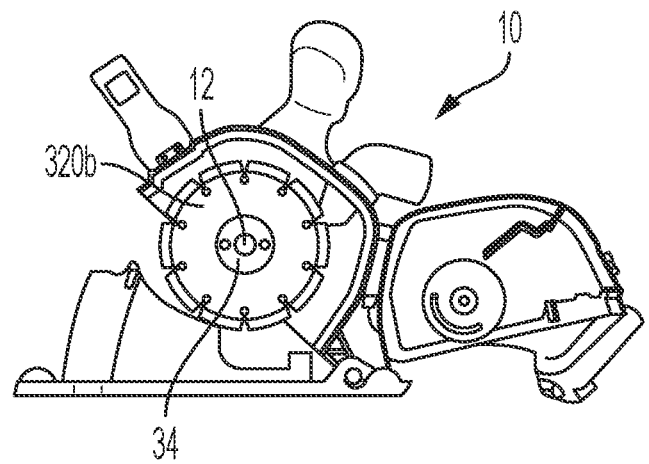
FIG. 32 illustrates a next stage of mounting the features in FIG. 20 to the wall chaser power tool in FIG. 2.

Next the nut 34 is threadably engaged with the rotatable shaft 12 as illustrated in FIG. 32. As the nut 34 is threaded onto the rotatable shaft 12 it moves along the shaft axis 18 towards the flange 46, thereby causing the support portions 330, 331, 332 and cutting discs 320a, 320b to be progressively clamped tighter between the nut 34 and flange 46 as the nut 34 is wound further onto the rotatable shaft 12. As a result, the support portions 330, 331, 332 and cutting discs 320a, 320b are fixed relative to the rotatable shaft 12 such that they rotate with the shaft 12 when the shaft 12 is rotatably driven. Clamping the cutting discs 320a, 320b between the support portions 330, 331, 332 enables each of the cutting discs to be supported at an oblique angle relative to the rotatable shaft 12 as described in relation to FIG. 21.

It is here mentioned that although a specific configuration has been described for supporting two cutting discs, in particular with reference to FIG. 21, in view of the foregoing disclosure it will be appreciated that other specific configurations of first, second and third support portions 330, 331, 332 will be suitable for mounting first and second cutting discs 320a, 320b at oblique angles relative to the rotatable shaft 12 of the wall chaser tool 10 provided that the extent of vibration induced in the rotatable shaft 12 during use of the wall chaser tool 10 is within acceptable limits. Also, the arrangement in FIG. 21 can be used with only a single cutting disc 320a, 320b. That is, if a user having the arrangement of features in FIG. 21 wanted to create a narrower channel in a concrete surface, they could remove one of the blades (e.g. the first cutting disc 320a) such that two support portions (e.g. the first and second support portions 330, 331) engage each other without a cutting disc between them.

Figure 33:
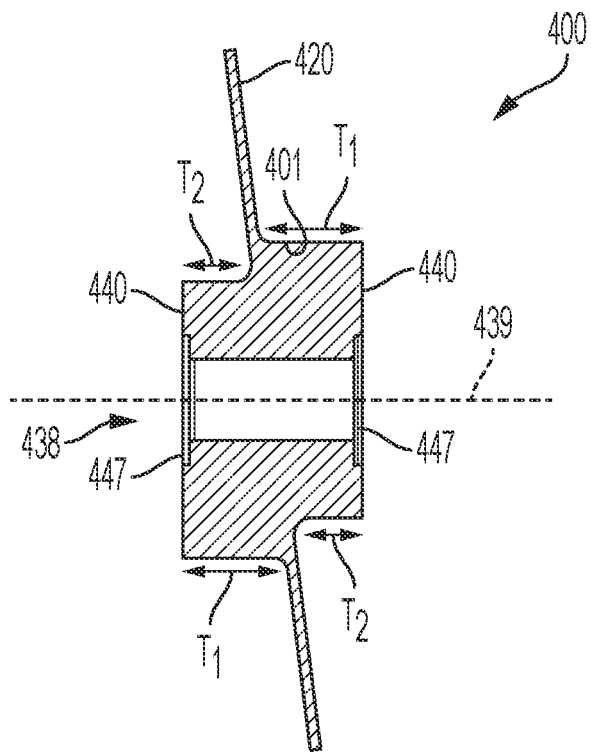
FIG. 33 is a cross-sectional view of a cutting element according to a further embodiment.
Figure 34:
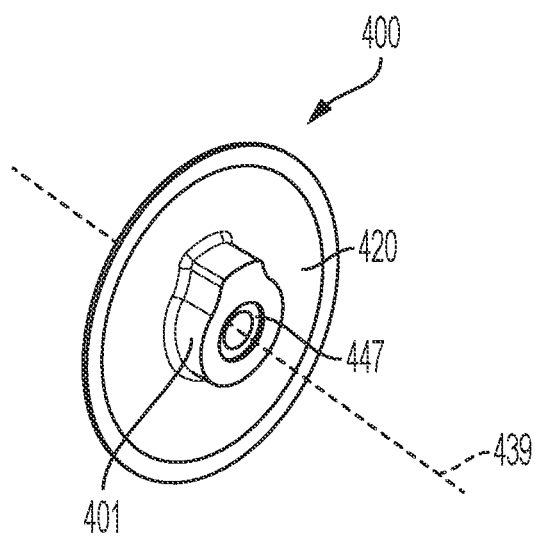
FIG. 34 is a perspective view of the cutting element in FIG. 33.

FIGS. 33 and 34 illustrate another embodiment, in particular a cutting element 400 for forming a channel in a concrete work surface when rotatably driven by the rotatable shaft 12 of the heretofore described wall chaser tool 10. The cutting element 400 has a body 401 defining an opening 438 for receiving the rotatable shaft 12, the opening 438 extending between opposite end surfaces 440 of the body 401. These end surfaces 440 are each in a plane perpendicular to the axis 439 along which the opening 438 extends. The extent of clearance between the outer surface of the rotatable shaft 12 and the inner surface of the opening 438 should be as small as possible, preferably requiring the cutting element 400 to be pushed along the rotatable shaft 12 by a user during a set up process against the force of friction arising between the outer surface of the rotatable shaft 12 and the inner surface of the opening 438. However, in view of the disclosure herein, persons skilled in the art will nevertheless appreciate that similar technical effects can still be achieved if a degree of clearance exists between the outer surface of the rotatable shaft 12 and the inner surface of the opening 438 provided that vibrations experienced by the rotatable shaft 12 in use are within acceptable limits.

The cutting element 400 also has a substantially circular blade 420 integrally formed with the body 401 at an oblique angle relative to the axis 439.

The cutting element 400 can be mounted in the wall chaser 10 by causing the rotatable shaft 12 to extend through the opening 438 and bringing an end surface 440 into contact with the flange 46 (like in FIG. 8). The nut 34 is then threadably engaged with the rotatable shaft 12 and tightened so as to clamp the cutting element 400 between the flange 46 and the nut 34. The circular blade 420 is thus supported at an oblique angle relative to the rotatable shaft 12 to achieve the oscillation effect heretofore described in relation to FIG. 16 during tool use for forming a channel.

Around the cutting element 400 a distance $T_1$ between the circular blade 420 and a first side of the body 401 is greater than a distance $T_2$ between the circular blade 420 and a second, opposite, side of the body 401. In an example embodiment the ratio of $T_1/T_2$ is 1.4 however it will be appreciated that this is not limiting and that other suitable ratios of $T_1/T_2$ can be used. Also, it is noted that the example embodiment illustrated in FIGS. 33 and 34 has a depression 447 on opposite sides thereof similar to the depressions 147 already described in relation to FIG. 18. However, in some embodiments of the cutting element 400 these depressions 447 may be excluded.

It is here stated that in view of the foregoing disclosure it will be appreciated that other specific configurations of the cutting element 400 are suitable provided that the extent of vibration induced in the rotatable shaft 12 during use of the wall chaser tool 10 is within acceptable limits. For example, the angle at which the circular blade 420 is provided relative to the axis 439 can be changed depending on the required degree of obliqueness for example 12.4 degrees relative to the axis 439.

Regarding specific materials the support portions heretofore described in this specification can be made from any suitable material, for example metal. An example metal can be steel, for example sintered steel.

It will be appreciated that whilst various aspects and embodiments have heretofore been described, the scope of the present invention is not limited thereto and instead extends to encompass all arrangements, and modifications and alterations thereto, which fall within the spirit and scope of the appended claims.

For example, some of the described embodiments like those described in relation to FIGS. 17, 18, 19 and 21 have three projections per support portion for interlocking with the three projections extending from another support portion. However, three such projections are not essential, and, in some embodiments, a different number of projections would be suitable, at least two such projections per support portion. Moreover, such projections need not necessarily be evenly circumferentially distributed, provided that they are capable of resisting relative rotation of the interlocked support portions. In particular, different configurations of projections (including e.g. size, shape and arrangement) which will restrict relative rotation of the interlocked support portions will be apparent to those skilled in the art upon reading this disclosure.

The cutting surfaces defined by the cutting discs 20, 320*a*, 320*b* and blade 420 described herein may be serrated (e.g. as illustrated in FIG. 2) or non-serrated.

Although the cutting discs 20, 320*a*, 320*b* and blade 420 described herein have been mentioned in an example as being mounted at an oblique angle of 7.50 degrees relative to the axis about which they rotate, other oblique angles are possible.

The flange 46 (see FIG. 8) is just an example of a stop feature for providing that things mounted on the rotatable shaft 12 do not scrape against the inside of the wall chaser housing in use. Various other configurations for a stop feature are possible e.g. a circumferentially arranged series of projections extending from the shaft 12.

Although the work surface in which a channel is formed has been described as a concrete work surface, other types of work surface are possible. For example, the teachings herein may be used to form a channel in a stone or masonry surface or generally any type of surface in which a channel may be formed.

Although the foregoing has been described in the context of wall chaser tools, this is merely an example of a context where the teachings may be applied. The teachings set out herein can be applied in other types of power tools where it is advantageous to mount a cutting blade at an oblique angle to its axis of rotation. A grinding or cutting power tool more generally, not necessarily a wall chaser tool, can include the teachings described herein to grind or cut a channel in a more efficient manner. Specific examples of other power tools in which the teachings described herein can be applied include grinders and plunge saws.

We claim:

1. A power tool for forming a channel in a concrete work surface comprising:
    a first section carrying a rotatable shaft extending along a shaft axis;
    a cutting disc having a substantially circular blade provided on the rotatable shaft by receiving the rotatable shaft through a circular opening of the cutting disc;
    a first support portion on one side of the cutting disc and a second support portion on the opposite side of the cutting disc,
        the first support portion having a first end surface perpendicular to the shaft axis and an opposing non-parallel second end surface,
        the second support portion having a first end surface perpendicular to the shaft axis and an opposing non-parallel second end surface,
        the first and second support portions cooperating to hold the cutting disc at an oblique angle relative to the shaft axis,
        each of the second end surfaces of the first and second support portions having a plurality of first locking features and second locking features, respectively,
        the plurality of first locking features of the first support portion and second locking features of the second support portion extend through and are spaced about the circular opening of the cutting disc whereby such locking features cooperate to resist relative rotation of the first and second support portions,
        wherein the plurality of first locking features of the first support portion comprise a first set of projections and the plurality of second locking features of the second support portion comprise a second set of projections;
    a second section for engaging the work surface, the first section being movable relative to the second section such that the cutting disc can be moved into and out of engagement with the work surface in use,
    wherein an active portion of the periphery of the cutting disc, being the part of the periphery furthest from the rotatable shaft in the direction of the work surface, oscillates along an axis parallel to the shaft axis when the rotatable shaft rotates.

2. The power tool of claim 1, wherein the plurality of first locking features of the first support portion interlock with the plurality of second locking features of the second support portion to resist relative rotation of the first and second support portions.

3. The power tool of claim 1, wherein the first and second support portions each have a rear surface distal from the cutting disc and at least two of the first set of projections have different lengths and at least two of the second set of projections have different lengths.

4. The power tool of claim 1, wherein at least two of the first set of projections have different lengths along a direction parallel to the rotatable shaft.

5. The power tool of claim 1, wherein each of the first and second sets of projections are circumferentially arranged.

6. The power tool of claim 1, wherein the first and second support portions each have a mass, and
    wherein the first support portion has a mass greater on a first side of the rotatable shaft and the second support portion has a mass greater on a second side of the rotatable shaft, wherein the second side is opposite the first side.

7. The power tool of claim 6, wherein the first and second support portions each define a fin, wherein in use the fin of the first support portion is located on an opposite side of the rotatable shaft to the fin of the second support portion.

8. The power tool of claim 7, wherein the thickness of the fin of the first support portion varies along the length thereof and the thickness of the fin of the second support portion varies along the length.

9. The power tool of claim 1, wherein the first and second support portions each comprise an opening through which the first and second support portions are mounted to the rotatable shaft.

* * * * *